United States Patent [19] [11] 4,084,998
Eichholz et al. [45] Apr. 18, 1978

[54] DEVICE FOR GRIPPING, PRESSING AND DEPOSITING TIRE CORES

[75] Inventors: Werner Eichholz; Gerd Krebs, both of Hamburg, Germany

[73] Assignee: Phoenix Gummiwerke AG, Hamburg, Germany

[21] Appl. No.: 676,987

[22] Filed: Apr. 14, 1976

[30] Foreign Application Priority Data

Jun. 5, 1975 Germany .................. 2525038

[51] Int. Cl.² ........................................... B29H 17/22
[52] U.S. Cl. ....................................... 156/403; 156/131; 269/20
[58] Field of Search ............... 156/394, 126, 131, 132, 156/398, 399, 400, 401, 402, 403; 269/20, 22, 30

[56] References Cited

U.S. PATENT DOCUMENTS

| 3,078,204 | 2/1963 | Appleby | 156/132 |
| 3,121,653 | 2/1964 | Trevaskis | 156/131 |
| 3,224,921 | 12/1965 | Frazier | 156/131 |
| 3,598,673 | 8/1971 | Carutta | 156/132 |
| 3,721,600 | 3/1973 | Cantarutti | 156/131 |
| 3,944,456 | 3/1976 | Cantarutti | 156/401 |

Primary Examiner—William A. Powell
Assistant Examiner—John E. Kittle
Attorney, Agent, or Firm—Allison C. Collard

[57] ABSTRACT

A device for gripping, pressing and depositing a tire core upon a raw tire blank, has a supporting cylinder which is shiftable axially and which consists of two rings located side by side and having parallel annular troughs upon their inner side. The annular troughs are airtightly covered by separate rings consisting of polyesterurethane or similar tough elastic plastic material with a high E-modulus. These rings have crack zones located mirror-like symmetrically in several radial planes; they are rigid against change in shape and cross-sectionally they are adjustable as toggle joints relatively to each other. The ring zones located closest to the ring center are swingable inwardly tongs-like in radial planes by increased air pressure.

10 Claims, 4 Drawing Figures

DEVICE FOR GRIPPING, PRESSING AND DEPOSITING TIRE CORES

This invention relates to a device for gripping, pressing and depositing a tire core upon a raw tire blank.

When making tires, including so-called Kfz tires, the treatment of the raw tire constitutes a substantial maufacturing proceudre. An important part during this manufacture is the application of a tire core consisting of wires upon a partly completed tire blank. In the simplest case the mounting of the tire core takes place by hand. Then the placing occurs by means of corresponding steering rings upon location provided for that purpose. However, in prior art devices this placing is not carried out with sufficiently high precision. A later shifting of the core in the tire blank can therefore take place during following manufacture and vulcanization. In bad cases power swingings can then take in the tire which for higher speeds lead to detrimental effects. These drawbacks also take place in cases wherein the tire core when placed upon the bottom side of the tire blank is fixed in its position. In that case the change in shape in lateral direction deviating from the precise ring shape is produced.

An object of the present invention is the making of a device of the described type which produces a tire blank the core of which lies with the highest precision upon the provided location and, furthermore, which can not have a deviation in the lateral direction.

Other ojects of the present invention will become apparent in the course of the following specification.

The device of the present invention is primarily used in connection with constructions wherein the tire core can be additionally placed under tension at the tire blank at the radial inner side.

In accomplishing the objectives of the present invention it was found desirable to provide a supporting cylinder which is shiftable axially and which consists of two rings located side by side and having parallel annular troughs upon their inner side. The annular troughs are airtightly covered by separate rings consisting of polyesterurethane or similar tough elastic plastic material with a high E-modulus. These rings have crack zones located mirror-like symmetrically in several radial planes; they are rigid against change in shape and cross-sectionally they are adjustable as toggle joints relatively to each other. The ring zones located closest to the ring center are swingable inwardly tongs-like in radial planes by increased air pressure.

The use of a plastic material with a high E-modulus results in making it possible to provide an exceptionally high and uniform pressure upon the core wire by air pressure or hydraulics. Due to the pressure which is everywhere uniformly divided, the toggle-like change in shape of the plastic ring divided in ring zones results in that the core wire receives an extremely precise radial orientation which remains up to its placing upon the tire core. The change in shape procedure of the plastic ring makes possible a selective adaptation to the shaping of the tire blank by inner pressure. This eliminates all types of changes of shape of the tire core up to its complete fixing upon the tire blank.

The axial shifting capacity of the supporting cylinder makes it possible to grip the tire core upon a centering drum, to press it while adjusting in axial direction and then place it precisely upon the location provided in the tire blank. All procedures can be carried out with great precision and with simple means. The result is a tire blank the tire core of which extends precisely radially and axially and which lies precisely upon the provided location.

The plastic ring consists preferably of three ring sections which are cross-sectionally movable toggle-like to each other. The part lying at the center of the supporting cylinder serves as the gripping ring, while the two other parts serve as steering rings for the gripping ring. The crack zones provided for the plastic ring lie relatively to the center of the cylinder behind each other radially outwardly, outwardly, innerly, outwardly. The provision of these crack zones makes possible due to the great hardness and elasticity of the material a shape change by each pressure which leads precisely to the provided movement procedures in space.

The edges of the plastic rings have strengthened ring feet and are clamped airtightly between correspondingly shaped form disks. This makes possible a simple and yet precise fixing of the ring edges. The fixing arrangement takes into consideration the provided changes in shape of the ring sections.

The inner edges of the ring form parts are advantageously provided with limiting stops. These stops provide primarily moving procedures which can be very precisely carried out. They prevent the particularly wide ring section from curving due to air pressure and eventually from changing the shape of the toggle joint beyond the dead center. Such a curvature could cause the ring section lying on the core wire to be applied with diminished force. Furthermore, it is advantageous to provide exchangeable distancing disks between the mold rings. These disks make possible the setting of the device to tire wires of different thicknesses. In order to make possible the shaping procedure of the plastic rings with diminished air pressure and also with pressed air, their section free of pressure is located in the middle shaping range between two extreme positions. This makes it possible to carry out the operation and the forming procedures with simple means and moderate operational pressures. Under special conditions the setting can be also carried out in such manner that only one plastic ring operates against a fixed radially directed disk.

The invention will appear more clearly from the following detailed description when taken in connection with the accompanying drawings showing by way of example only, a preferred embodiment of the inventive idea.

Figure 1:
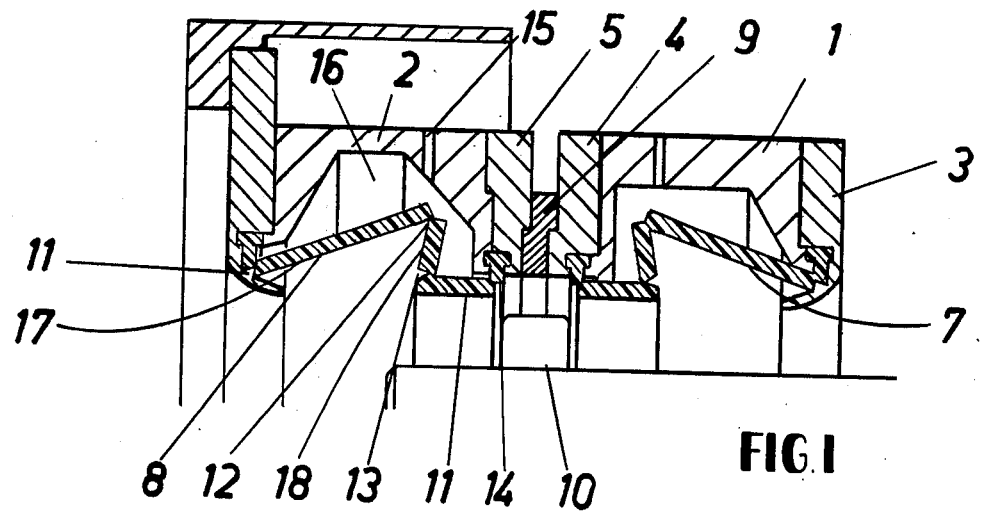
FIGS. 1, 2 and 3 are similar sectional views of a part of the device illustrating different operational positions.
Figure 2:
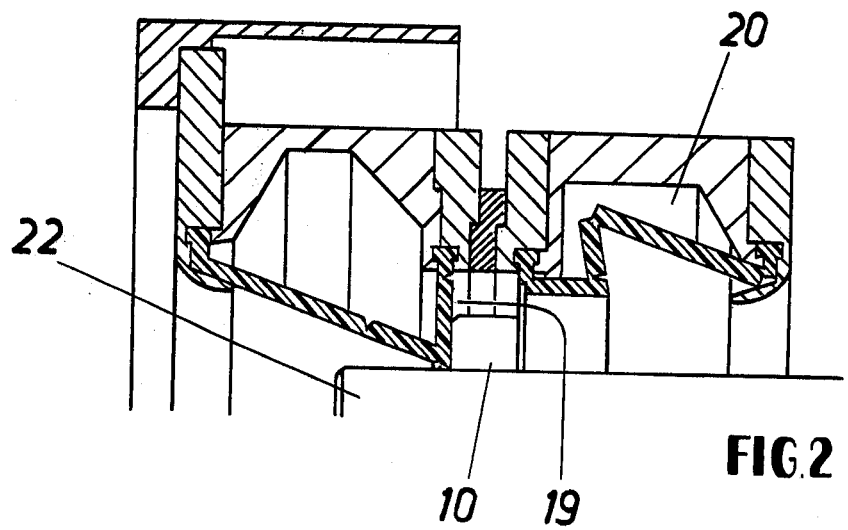
Figure 3:
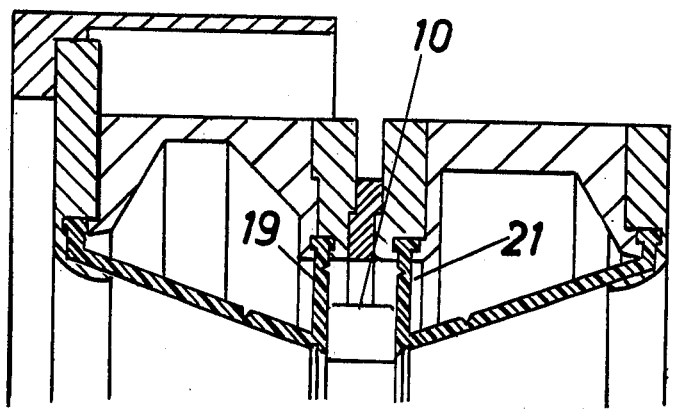

The device illustrated in FIGS. 1, 2 and 3 comprises a supporting cylinder consisting of two mold rings land 2. Fixing disks 3, 4, 5 and 6 are provided at the front sides of these rings. These disks in combination with the rings make is possible to fix the edges of the two plastic rings 7 and 8 in corresponding recesses. A distancing disk 9 which in set to the axial size of the tire core 10, is located between the fixing rings 4 and 5. The plastic rings consists of polyesterurethane with an E-modulus of approximately 500 Kp/mm$^2$.

The plastic rings 7 and 8 are mirror-like symmetrical relatively to each other. They have four crack zones 11, 12, 13 and 14. When pressed air reaches the trough shaped hollow space 16 through the opening 15, there is a change in shape of these crack zones, whereby the inwardly bent parts 17 and 18 are stretched toggle-like, and the part 19 swings. This condition is illustrated on the left side of FIG. 2. When according to FIG. 2 the ring portion 19 is moved upon the tire core 10, the hollow space 20 is also subjected to air pressure, so that this plastic ring carries out mirror-like the same movement. In the final position shown in FIG. 3, the core 10 is pressed between the ring portions 19 and 21 and directed at the same time. In this arrangement the centering drum 23 upon which lies the core 10, cooperates from the radial inwardly located side. In this condition the core including the gripping device can be shifted axially and thereupon placed upon the tire blank.

The crack zone 13 is somewhat shifted in the direction toward the central section of the ring portion 19. This makes possible a strong pressure between the ring portion and the wire core. The crack zones are so arranged that they are closed at the steering rings in the stretched condition. This makes it possible to provide a particularly high pressure in combination with the toggle effect, which is also of importance for the property of the tire core. This substantially eliminates a later form change of the tire core when tissues are wrapped.

The present invention includes various features indicated in the drawings. It should be noted that the illustration of FIGS. 1, 2 and 3 is on the scale 1:2 to the actual size. This makes it possible to easily determine the thickness of the plastic rings, the depth of notching in the crack zones and the length relationship of the individual toggle levers to each other.

Figure 4:
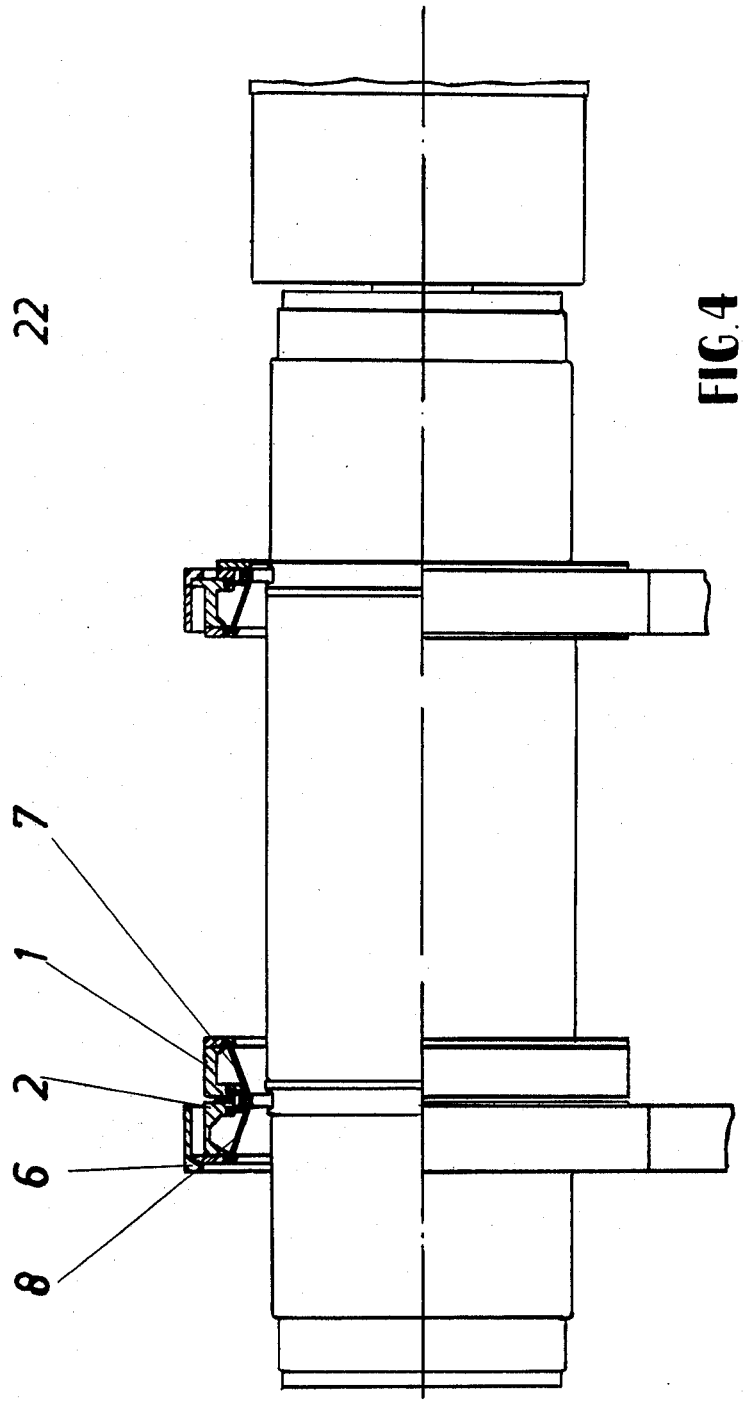
FIG. 4 is a side view partly in section illustrating the arrangement of gripping devices upon a winding drum.

FIG. 4 shows two gripping devices placed in the provided position after the removal of a separate core wire from the centering drum 22. The two gripping devices differ from each other in that one of them is them is already described and illustrated in FIGS. 1–3 as having two rings 1 and 2. The second illustrated gripping device has only one ring and presses the core wire against a fixed stop ring. The drawing clearly shows this construction.

What is claimed is:

1. A device for gripping, pressing and depositing tire cores upon a raw tire blank, comprising:
   an axially shiftable supporting cylinder including two rings located side-by-side, each of which has a single inner annular trough parallel to the trough located in the adjacent ring; and
   two separate rings, each of which airtightly covers one of said troughs and includes a plurality of spaced, annularly-extending grooves formed therein which define annular zones separated by articulated joints and which permit pivotal movement of said annular zones in a toggle-like manner with respect to each other, said grooves formed in one ring being reversely arranged relative to the grooves formed in the other ring to provide a mirror-like symmetry between said rings, and each of said rings having an inner axially adjacent annular zone which, under the influence of fluid pressure, is inwardly swingable toward the inner annular zone of the other ring to provide a tong-like movement facilitating the gripping of a bead core between the two adjacent inner annular zones of said two rings.

2. The device as recited in claim 1, wherein the last-mentioned rings are fabricated from polyesterurethane.

3. The device as recited in claim 1, wherein said grooves of said last-mentioned rings define three movable annular zones, said inner zone of which constitutes a gripping ring and an intermediate and outer zone which constitute steering rings.

4. The device as recited in claim 3, wherein said three annular zones of said last-mentioned rings are defined by four spaced grooves formed in each of said rings which open respectively radially outwardly, outwardly, inwardly and outwardly, the first- and second-mentioned outwardly opened grooves defining therebetween said outer annular zone, said second-mentioned outwardly opened and said inwardly opened grooves defining therebetween said intermediate annular zone and said inwardly-opened and the third-mentioned outwardly-opened groove defining therebetween said inner annular groove.

5. The device as recited in claim 4, wherein at least one of said grooves is shiftable relative to pivotal movement of said gripping ring and said steering rings.

6. The device as recited in claim 1, wherein the supporting cylinder has ring carrying portions and wherein the last-mentioned rings have strengthened edges clamped in said ring carrying portions.

7. The device as recited in claim 6, wherein the first-mentioned rings have outer portions with a limiting stop.

8. The device as recited in claim 1, additionally comprising a removable disk located between the first-mentioned rings.

9. The device as recited in claim 1, wherein at least one of the last-mentioned rings is movable in a range between two extreme operable shaping positions and is in a tension-free condition when disposed in a position intermediate said extreme shaping positions.

10. A device for gripping, pressing and depositing tire cores upon a raw tire blank, comprising:
    an axially-shiftable supporting cylinder including a first ring having a single inner annular trough and a fixed stop ring located side-by-side;
    a second ring which airtightly covers said trough, said second ring having a plurality of spaced annularly-extending grooves formed therein which define annular zones separated by articulated joints and which permit pivotal movement of said annular zones in a toggle-like manner with respect to each other, and said second ring having an inner annular zone axially adjacent said first stop ring, which, under the influence of fluid pressure, is inwardly swingable in a tong-like movement toward said fixed stop ring facilitating the gripping of a bead core between said inner annular zone and said fixed stop ring.

* * * * *